United States Patent [19]

Pearson et al.

[11] Patent Number: 5,531,248
[45] Date of Patent: Jul. 2, 1996

[54] BUTTERFLY VALVE

[75] Inventors: James E. Pearson, Downers Grove; Dennis R. Carls, Geneva, both of Ill.

[73] Assignee: Eaton Corporation, Cleveland, Ohio

[21] Appl. No.: 375,011

[22] Filed: Jan. 19, 1995

[51] Int. Cl.⁶ .................................................. F16K 1/22
[52] U.S. Cl. .................... 137/625.46; 251/305; 251/306
[58] Field of Search ................................. 251/305, 306, 251/308; 137/625.46

[56] References Cited

U.S. PATENT DOCUMENTS

| | | | |
|---|---|---|---|
| 2,586,927 | 2/1952 | Fantz | 251/306 |
| 3,214,132 | 10/1965 | Goldthorpe | 251/306 X |
| 3,804,366 | 4/1974 | Rubright | 251/305 |
| 3,857,406 | 12/1974 | Dorling | 251/306 X |
| 4,361,170 | 11/1982 | Peloza | 251/305 X |

*Primary Examiner*—John C. Fox
*Attorney, Agent, or Firm*—Roger A. Johnston

[57] ABSTRACT

A butterfly valve having a plastic body with a one-piece valve member formed of thermoplastic elastomer with an integral hub with torque transmitting surfaces which are engaged by lugs on a rigid shaft received in the hub and the shaft is journalled for rotation in the valve body. The valve member has integral thin blade portions extending in opposite directions from the hub with a thickened rim formed about the periphery of the blade with the edge of the rim preferably chamfered. The preferred butterfly member has integral stiffening ribs extending centrally from the hub along the blades to the rim.

10 Claims, 1 Drawing Sheet

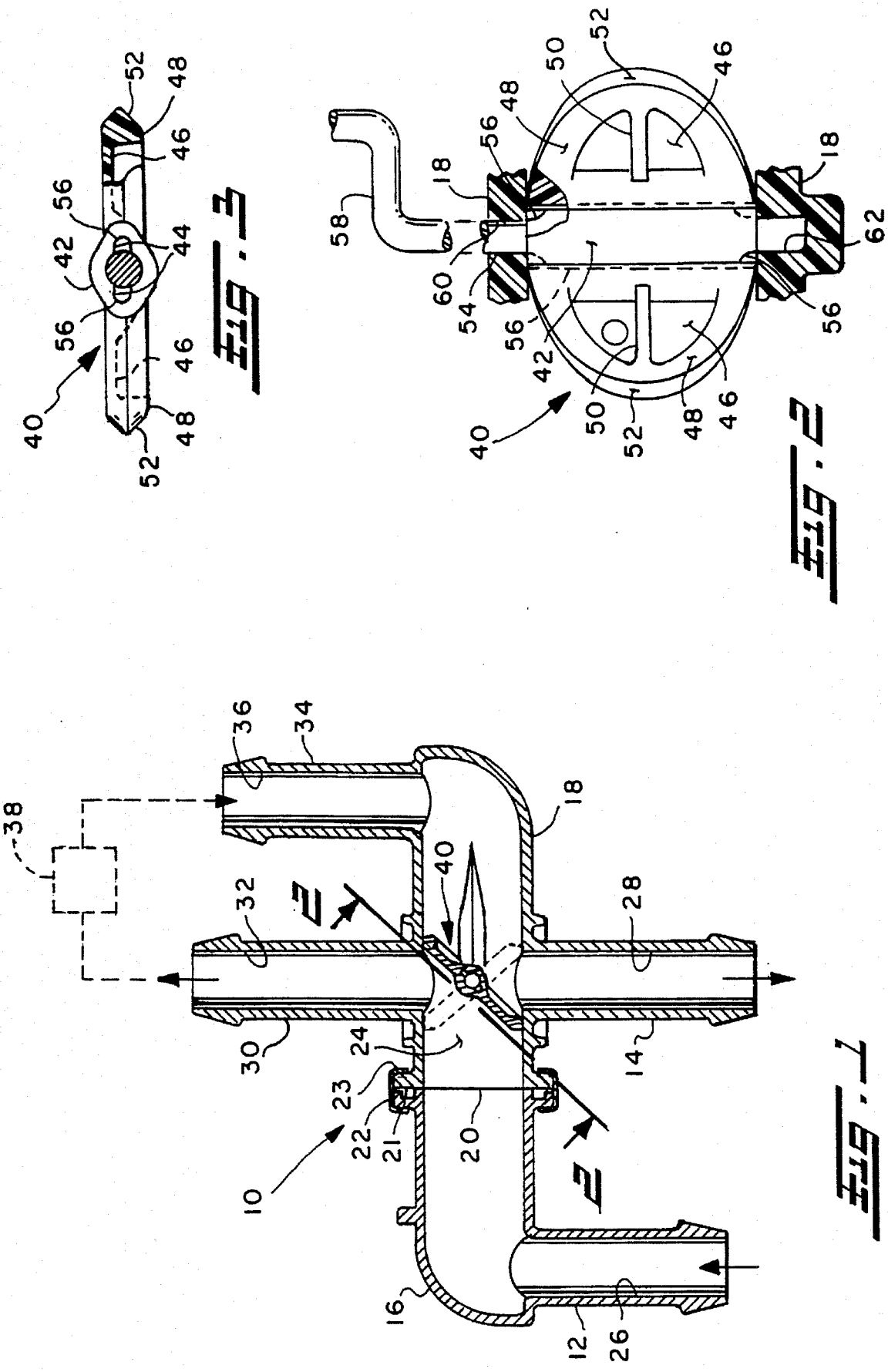

BUTTERFLY VALVE

BACKGROUND OF THE INVENTION

The present invention relates to valves of the type having a pivoted throttle plate or butterfly member and particularly valves of this type which are employed for valving flow from a single inlet to a single outlet or for diverting flow from one of a plurality of outlets to another outlet. Butterfly valves are often employed where the force available to actuate the valve is minimal and thus the fluid pressure forces acting on the valving member must be maintained at a relatively low level. Diverter valves of this type are often employed in automotive applications for controlling flow of engine coolant to be either recirculated through the engine or diverted to a heat exchanger utilized for passenger compartment heating. Such automotive heater valves are typically actuated by small electric servomotors or diaphragm operated vacuum actuators which due to size and weight requirements are capable of providing only a few ounces of force for opening the valve. Butterfly-type valves have been found to be particularly suitable for such low-operating force applications because the pressure forces of the fluid act upon the throttle member or butterfly on opposite sides of the pivot and are generally balanced and thus the force required to move the butterfly is minimized.

In certain valve applications it is desired to provide a diverter valve having a plastic body such as high-volume production automotive applications where manufacturing costs must be minimized. In plastic bodied valves it is required that the butterfly member have some degree of resiliency in order to effect a seal about the periphery of the butterfly in either of the closed or first or second diverter position. It is also desired to have a resilient periphery to the butterfly member to accommodate very small foreign particles in the fluid being valved in order to prevent blocking of the butterfly member from sealing about its periphery against the wall of the valving chamber about the ports of the valve. Thus, it has been desired to provide a low cost resilient butterfly member in a valve, particularly a diverter valve of the type employed in automotive heater flow control systems which can seal and block flow in a desired position with a relatively low actuating operating force applied to the valve member.

SUMMARY OF THE INVENTION

It is an object of the present invention to provide a butterfly-type valve having a resilient butterfly plate member formed integrally of resilient material with a hub having torque transmitting surfaces therein, and relatively thin blades extending outwardly from the hub with a thickened peripheral rim with a rigid shaft received through the hub and engaging the torque transmitting surfaces. The shaft is journalled in the valve body for enabling pivotal movement of the butterfly member.

It is another object of the present invention to provide a butterfly-type valve having a valve body of non-metallic material with a resilient butterfly formed integrally with a hub having torque transmitting surfaces and relatively thin blades extending outwardly from the hub in opposite directions with a thickened peripheral rim portion having a rigid shaft received in the hub and engaging the torque transmitting surfaces and with the shaft journalled in the valve body with the rim of the butterfly member chamfered for facilitating sealing of the rim against the valve body.

The valve of the present invention has a body preferably formed of plastic material with an integrally formed butterfly valving member formed of preferably thermoplastic elastomer having a hub portion with torque transmitting surfaces on the inner periphery, a pair of oppositely directed relatively thin blade portions having the periphery thereof formed in a thickened rim and with a rigid shaft received in the hub and engaging the torque transmitting surfaces. The ends of the shaft are journalled in the valve body and the edges of the thickened rim of the butterfly are preferably chamfered for facilitating sealing of the butterfly member about the valve body. In the illustrated embodiment, the valve has the configuration of a diverter valve with a single inlet employing the butterfly to direct float flow selectively to either of two outlets. The valve has a second inlet for receiving return flow from a system connected to one of the outlets; and, the return flow is discharged through the non-selected outlet.

BRIEF DESCRIPTION OF THE DRAWINGS

FIG. 1 is a cross-section of the valve assembly of the present invention as embodied in a diverter valve;

FIG. 2 is a section view taken along section indicating lines 2—2 of FIG. 1.

FIG. 3 is a top view of FIG. 2; and,

DETAILED DESCRIPTION

Referring to FIG. 1, the invention is shown as embodied in a valve assembly indicated generally at 10 and in the embodiment illustrated has an inlet fitting 12 adapted for connection to a supply of fluid, such as engine coolant and a return outlet fitting 14 adapted for connection to a recirculation line (not shown) to the source. The fittings 12, 14 are formed as part of a valve body comprising left hand shell 16 and right hand shell 18, preferably of plastic material, which are joined about a parting line 20 by a suitable expedient such as a pair of flanges 21, 23 and a clamping band 22 thereover. The interior of shell 16 and shell 18 define a valving chamber denoted by reference numeral 24 which communicates with inlet passage 26 formed in fitting 12 and with recirculation outlet passage 28 formed in fitting 18 provided on the right hand shell 18.

Shell 18 also has formed thereon an outlet fitting 30 disposed to extend generally in an opposite direction to fitting 18; and, fitting 30 has an outlet passage 32 formed therein which communicates with the valving chamber or passage 24. Fitting 30 is adapted for connection to the inlet of a flow-through device, as, for example, a heat exchanger which circulates flow through a second inlet fitting 34 provided on the shell 18 which has an inlet passage 36 also communicating with valving chamber 24. The heat exchanger is indicated by dashed outline and reference numeral 38 in FIG. 1. It will be understood that valve 10 may be connected to other fluid circuits and is not limited to a heat exchanger application as shown in the drawings.

The valve 10 has a butterfly valve member indicated generally at 40 pivotally disposed in the chamber 24. The butterfly member 40 is moveable between the position shown in solid outline in FIG. 1 and the position shown in dashed outline in FIG. 1 by a force supplied by an external actuator (not shown).

In the position shown in solid outline in FIG. 1, flow from inlet passage 26 is diverted by the butterfly member 40 outwardly through passage 32, which flow passes through heat exchanger 38 and returns through passage 36 and is diverted outwardly through passage 28.

It will be understood that when the butterfly member 40 is moved to the position shown in dashed outline in FIG. 1, flow entering valving chamber 24 from inlet 26 is diverted directly to outlet passage 28 for return to the source. Thus, with the butterfly member 40 in the position shown in dashed outline in FIG. 1, no flow is created in outlet passage 32 and inlet passage 36.

Referring to FIGS. 2 and 3, butterfly member 40 is shown as having formed integrally therewith a hub portion 42 with torque transmitting surfaces 44 provided therein preferably in the form of grooves provided on the opposite sides thereof. Butterfly 40 also has formed integrally therewith a pair of oppositely directed relatively thin blade portions 46 extending outwardly from the hub portion 42. A relatively thickened rim portion 48 is formed integrally about the periphery of the blades 46.

In the presently preferred, practice each of the blade portions 46 has a central stiffening web 50 formed thereon which extends outwardly from the hub portion 42 to the rim 48. The butterfly member 40 is preferably integrally molded of thermoplastic elastomer; and, the configuration illustrated with the relatively thin blades 46 and thickened rim provides for the desired resiliency and facilitates the flow of material during molding. In the presently preferred practice, the outer periphery of the rim 48 is chamfered as denoted by reference numeral 52 in FIGS. 2 and 3.

A rigid shaft 54 having outrigger or wing-like lug portions 56 extending in opposite directions therefrom is received in the hub 42 with the lugs 56 engaging the torque transmitting surfaces or grooves 44 in the hub. The shaft 54 has its ends extending beyond the hub; and, if desired, one end of the shaft may be formed into a crank 58 for connection to a servoactuator (not shown). The portions of the shaft 54 adjacent the edges of the butterfly 40 are respectively journalled in the housing shell 18 on opposite sides of the chamber 24 to facilitate the movement of the butterfly 40 between the positions shown in solid and dashed outline in FIG. 1.

In assembly, the butterfly is inserted into the chamber 24 in right shell 18 and shaft 54 is inserted through an aperture 62 provided on one side of shell 18 and through the hub 42 of the butterfly 40. The end of the shaft protruding through the hub 42 is journalled in a blind bore 64 formed in the inner wall of the shell 18. The configuration of the butterfly thus facilitates assembly of the valve and simplifies the construction by minimizing the number of parts. The arrangement of the blade portions 46 and thickened rim 48 with the chamfered surfaces 52 provides a resilient member capable of adequately sealing against the walls of chamber 24 with a minimum actuator force on shaft crank 58.

Although the invention has hereinabove been described with respect to the illustrated embodiments, it will be understood that the invention is capable of modification and variation and is limited only by the following claims.

We claim:

1. A valve assembly comprising:
   (a) a valve body having an inlet adapted for connection to a fluid source, an outlet, and a valving passage communicating with said inlet and outlet;
   (b) a resilient butterfly disposed in said passage and pivotally moveable therein between a first position and a second position seating on said body for controlling flow between said inlet and outlet, said butterfly formed integrally and having:
      (i) a hub portion having certain inner surfaces formed therein adapted for torque transmitting engagement,
      (ii) a pair of relatively thin blade portions extending outwardly from said hub in opposite direction therefrom,
      (iii) a rim portion extending about the periphery of said blade portion, said rim having a thickness significantly greater than said blade portion and defining certain surfaces thereon for effecting said seating; and,
   (c) a shaft received through said hub portion, said shaft having surface portions thereof engaging said certain inner surfaces of said hub portion, said shaft journalled for rotation on said body.

2. The assembly defined in claim 1, wherein said butterfly is formed of thermoplastic elastomer.

3. The assembly defined in claim 1, wherein said butterfly blade portion includes a stiffening rib extending from said hub to said rim.

4. The assembly defined in claim 1, wherein said butterfly rim certain surfaces comprise chamfering to facilitate seating against said body.

5. A method of making butterfly valve comprising:
   (a) forming a body having an inlet, outlet and valving passage communicating with the inlet and outlet;
   (b) forming an integral butterfly member having a hub with torque transmitting surfaces therein, a pair of their blade portions extending oppositely directed form said hub and a thickened rim portion extending about the periphery of the blades and forming seating surfaces on the rim;
   (c) disposing a shaft in said hub and engaging said torque transmitting surfaces;
   (d) disposing said butterfly member in said valving passage and journalling said shaft in said body and rotating said shaft and contacting said seating surfaces on said body for controlling flow between said inlet and outlet.

6. The method defined in claim 5, wherein said step of forming a butterfly includes forming a stiffening rib on said blades extending from the hub to the rim.

7. A diverter valve assembly comprising:
   (a) a body having a valving passage and an inlet and a first and second outlet communicating with said passage;
   (b) a resilient butterfly disposed in said passage and pivotally moveable between a position directing flow from the inlet primarily to the first outlet and a position directing flow primarily to said second outlet and a plurality of intermediate positions, said butterfly formed integrally and having:
      (i) a hub portion with torque transmitting surfaces formed on the inner periphery thereof,
      (ii) a pair of relatively thin blade portions extending outwardly from said hub in opposite directions,
      (iii) a rim portion extending out the periphery of said blade portion, said rim having a thickness significantly greater than said blade portion and defining surfaces thereon for effecting said seating; and,
   (c) a shaft received through said hub portion, said shaft having surface portions thereof engaging said hub torque transmitting surfaces with the ends of said shaft journalled in said body.

8. The valve assembly defined in claim 7, wherein said butterfly has a stiffening rib extending from the hub to the rim for each of said blades.

9. The valve assembly defined in claim 7, wherein said butterfly member is formed of thermoplastic elastomer.

10. The valve assembly defined in claim 7, wherein said butterfly member has the periphery of said rim chamfered.

* * * * *